United States Patent [19]

Iwama et al.

[11] 4,404,848

[45] Sep. 20, 1983

[54] METHOD FOR CORRECTING MEASUREMENT ERRORS IN TIRE UNIFORMITY INSPECTING MACHINES

[75] Inventors: Atsuaki Iwama; Yoshimata Maikuma, both of Kobe; Masayoshi Okamoto, Kakogawa; Toshikazu Tanaka, Ashiya; Yuji Oikawa, Kobe, all of Japan

[73] Assignee: Kabushiki Kaisha Kobe Seiko Sho, Kobe, Japan

[21] Appl. No.: 351,513

[22] Filed: Feb. 23, 1982

[30] Foreign Application Priority Data

Feb. 26, 1981 [JP] Japan .................................. 56-29015
Mar. 3, 1981 [JP] Japan .................................... 5630605

[51] Int. Cl.³ .......................................... G01M 17/02
[52] U.S. Cl. ....................................................... 73/146
[58] Field of Search ..................... 73/146, 8, 1 R, 117, 73/1 B, 462

[56] References Cited

U.S. PATENT DOCUMENTS

3,289,471 12/1966 Maxwell .............................. 73/117
3,690,165 9/1972 Sturmo et al. ....................... 73/126
4,338,818 7/1982 Hill et al. ............................. 73/462

Primary Examiner—Donald O. Woodiel
Attorney, Agent, or Firm—Oblon, Fisher, Spivak, McClelland & Maier

[57] ABSTRACT

A method for correcting errors of measurement in a tire uniforming inspecting machine having a pair of upper and lower rims engageable with bead portions of a tire for gripping the tire securely for rotation at a predetermined position and a load wheel engageable with the circumference of the tire at one side thereof to check for variations in the radial force, including: measuring radial runout of the rims and/or load wheel to obtain an erronous deflection signal indicating the amount of radial runout of the rims and/or load wheel; obtaining and storing a primary harmonic component of the erroneous deflection signal; measuring variations in radial force of a tire rotated on the rims to obtain a radial variation signal for a period of one revolution of the tire; multiplying the erroneous deflection signal by a spring constant of the tire to obtain an erroneous variation signal; and subtracting the erroneous variation signal from the radial variation signal to eliminate influence of radial runout of the rims and/or load wheel from the measured value of the radial force of the tire.

7 Claims, 14 Drawing Figures

METHOD FOR CORRECTING MEASUREMENT ERRORS IN TIRE UNIFORMITY INSPECTING MACHINES

BACKGROUND OF THE INVENTION (1) Field of the Invention

This invention relates to a method for correcting measurement errors due to radial runout of rims and/or of a load wheel in a tire uniformity inspecting machine.

(2) Description of the Prior Art

In tire uniformity inspecting machines, the uniformity of a tire is inspected by measuring variations in the reaction force of a tire as imposed on the circumferential surface of a load wheel which is maintained at a constant distance from the center of tire-supporting rims. However, it is often the case that the measured values contain errors due to rotational deflections of the rims which grip the inspecting tire and/or of the load wheel. For example, if a rim with a rotational deflection of 25 microns is used for the inspection of a tire with a spring constant of 20 kgf/mm, the measured RFV (radial force variation) contains an error of 0.5 kgf which is a value obtained by multiplying the amount of radial runout by the spring constant. Recently, tires have been considerably improved in the value of uniformity and usually are required to have a RFV value smaller than 10 kgf, in some cases a RFV value of 8 kgf or 5 kgf. Therefore, the error component of 0.5 kgf in such a small RFV value is unignorable and should be suppressed to a minimum. Of course, the rotational component parts of the tire uniformity inspecting machines are manufactured with an extremely high precision, including the upper and lower rims, the mechanism for rotating the rims, and the load wheel. However, as a matter of fact, it is impossible to make zero the deflections of the machined rotational component parts partly because of technical difficulties and partly because of uneconomically large expenses involved in the machining operations. In addition, small deflections also occur due to deteriorations of the rotational component parts or due to rust or bruises which are developed on the tire retaining portions during use of the inspecting machines. Even if the rotational component parts are fabricated with an accuracy on the order of 10 microns as unit bodies, a radial runout builds up to a value on the order of 20 microns and are developed when they are assembled. Since complete elimination of the rotational defections of the rims and load wheels is difficult, it is more practical to accept a certain degree of deflections and to correct errors of measurement due to deflections of rims and/or a load wheel by subtracting influences of rotational deflections from measured values.

SUMMARY OF THE INVENTION

With the foregoing situations in view, the present invention has as its object the provision of a method for correcting errors of measurement as caused in tire uniformity inspecting machines due to radial runout of tire-supporting rims and/or a load wheel.

It is a more specific object of the present invention to provide a method for eliminating an erroneous component which creeps into the measured value of radial force of a tire due to rotational deflection of the rims and/or load wheel.

According to one aspect of the present invention, there is provided a method for correcting errors of measurement in a tire uniforming inspecting machine having a pair of upper and lower rims engageable with bead portions of a tire for gripping the tire securely for rotation at a predetermined position and a load wheel engageable with the circumference of the tire at one side thereof to check for variations in the radial force. The method includes: measuring radial runout of the rims and/or load wheel to obtain an erroneous deflection signal indicating the amount of radial runout of the rims and/or load wheel; obtaining and storing a primary harmonic component of the erroneous deflection signal; measuring variations in radial force of a tire rotated on the rims to obtain a radial variation signal for a period of one revolution of the tire; multiplying the erroneous deflection signal by a spring constant of the tire to obtain an erroneous variation signal; and subtracting the erroneous variation signal from the radial variation signal to eliminate influence of radial runout of the rims and/or load wheel from the measured value of the radial force of the tire.

The rims are usually rigidly fixed to an end portion of a drive shaft, so that it may occur that the rotational deflections of one rim remain the same and the data of one measurement is effective until it is replaced. However, actually this is not the case. One rim shows different radial deflections due to wear of the rim itself by contact with tires, production of rust or other factors. Therefore, it is desirable to measure the rotational deflections of rims every other week or at suitable time intervals.

A more complete appreciation of the invention and many of the attendant advantages thereof will be readily obtained as the same becomes better understood by reference to the following detailed description when considered in connection with the accompanying drawings, wherein:

DESCRIPTION OF PREFERRED EMBODIMENTS

Figure 1:
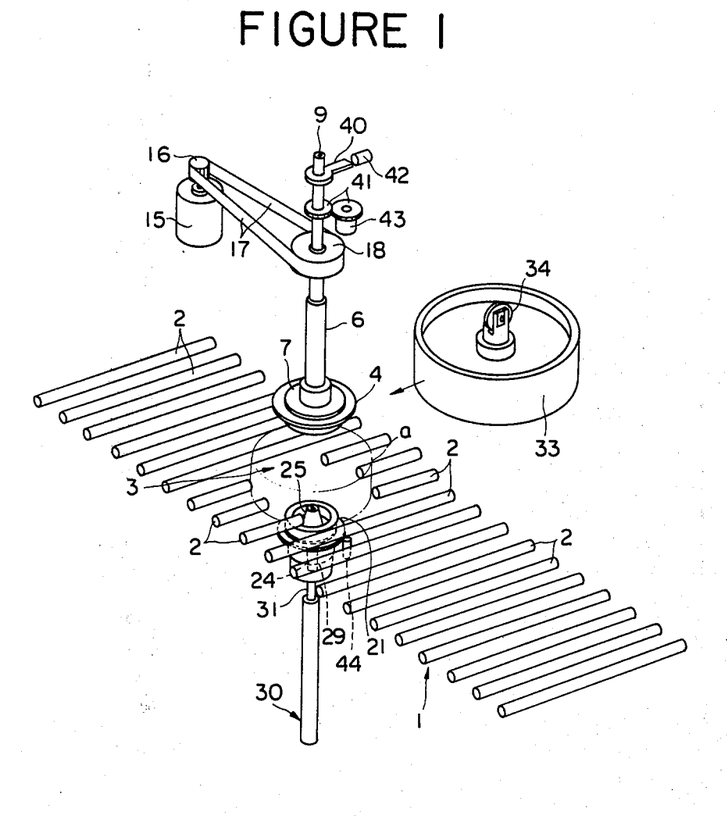
FIG. 1 is a diagrammatic perspective view of a tire uniformity inspecting machine incorporating the method of the present invention.
Figure 2:
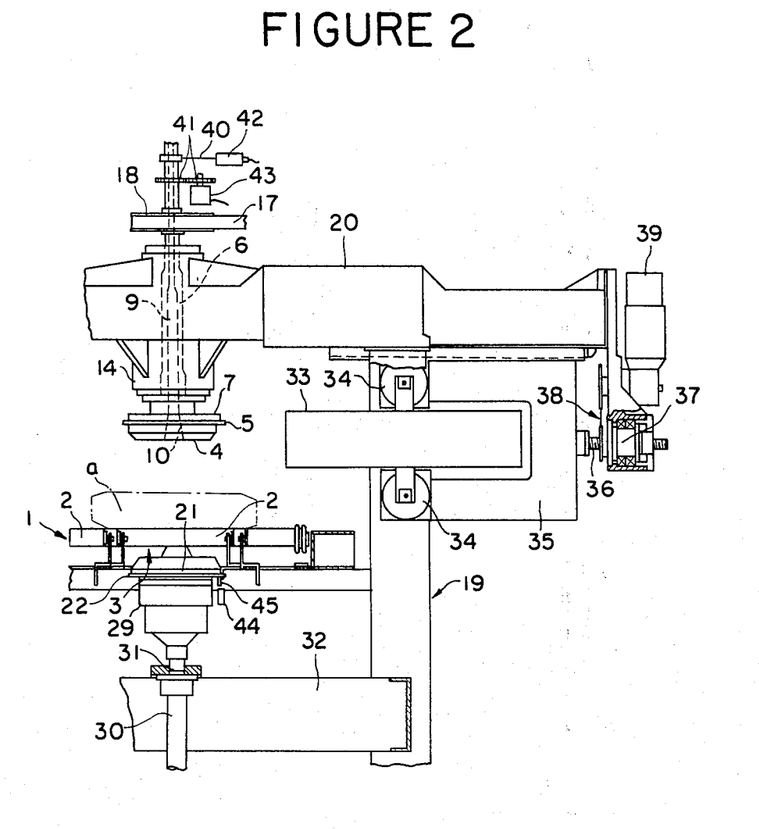
FIG. 2 is a diagrammatic front elevational view of the same inspecting machine.
Figure 3:
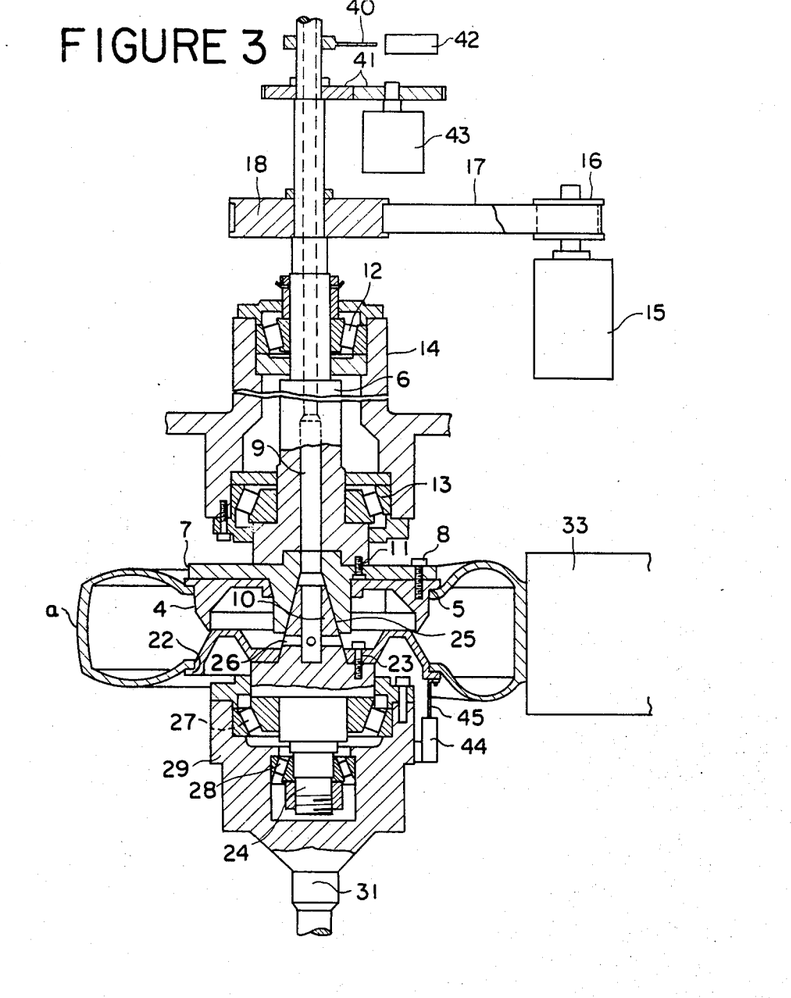
FIG. 3 is a diagrammatic vertical cross-sectional view showing on an enlarged scale main component parts of upper and lower rim assemblies.

Referring now to the accompanying drawings wherein like reference numerals designate identical or corresponding parts throughout the several views, and first to FIGS. 1 to 3, there is shown a tire uniformity testing machine incorporating the correcting method according to the present invention, in which indicated at (a) is a tire to be inspected, and at 1 a conveyer with a multitude of rollers 2 which are rotatingly driven in one direction for transferring the tire (a). Centrally at a predetermined position of the conveyer 1, there is provided an opening 3 which is formed by removing part of the rollers 2 and which has a size small enough for preventing the tire (a) from falling. Designated at 4 is an upper rim which is located above the opening 3 and which is provided with a circular flange 5 which snugly engages with the inner peripheral edge of one bead portion of the tire (a). The upper rim 4 is detachably secured to a seat member 7 at the lower end of a drive shaft 6 by screws 8. The drive shaft 6 is axially provided with a compressed air passage 9 in communication with a downwardly diverging conical bore 10 which is formed in the seat member 7. The seat member 7 is attached to the lower end of the drive shaft 6 by screws 11. The drive shaft 6 is supported by a pair of conical roller bearings 12 and 13 in a bearing case 14 for rotation about a vertical axis alone, and rotatingly driven in an arbitrary direction from a motor 15 through a belt 17 lapped around pulleys 16 and 18. The bearing case 14 is mounted on an overhanging support beam 20 of a machine frame 19 which supports the roller conveyer 1. Denoted at 21 is a lower rim which is located immediately beneath the opening 3. The lower rim 21 is provided with a circular flange 22 which snugly engages with the inner peripheral edge of the other bead portion of the tire (a) and which is detachably mounted at the upper end of an elevator shaft 24 by screws 23. The elevator shaft 24 is provided with an axially projected nose portion 25 which is disengageably engageable from beneath with the conical bore 10 in the seat member 7. When the nose portion 25 is held in pressed engagement with the conical bore 10, air ports 26 which are in communication with the air passage 9 in the drive shaft 6 are opened in radial directions to supply compressed air into the tire (a) which is gripped between the upper and lower rims 4 and 21. The elevator shaft 24 is supported by a pair of upper and lower conical bearings 27 and 28 in a bearing case 29 for rotation about a vertical axis alone. The bearing case 29 is formed integrally at the upper end of a piston rod 31 of a piston-cylinder 30. The piston-cylinder 30 is mounted on a lower beam 32 of the machine frame 19 for lifting up and down the lower rim 21 relative to the conveyer 1. The reference numeral 33 denotes a load wheel which is provided with load cells 34 on opposite sides thereof. The load wheel 33 is rotatably supported on a retractably movable frame 35 for idling operation about a vertical axis. The frame 35 is movable toward and away from the tire (a) along the upper beam 20 of the machine frame 19 and driven back and forth from a reversible motor 39, through a screw shaft 36 which is fixedly mounted on the frame 35 in meshed engagement with a ball screw type rotation-only female screw 37 which is linked to the motor 39 through a chain transmission mechanism 38. A tire (a) which has been delivered to a position immediately above the lower rim 21 by the conveyer 1 is guided into a centered position in alignment with the axes of the upper and lower rims 4 and 21 by a plural number of swingable pressing arms (not shown) which are provided centrally over the conveyer 1.

In operation, as soon as a tire (a) to be inspected is delivered by the conveyer 1 to a position above the lower rim 21, the conveyer 1 is stopped and the pressing arms are swung in to center the tire (a) in alignment with the axes of the upper and lower rims 4 and 21. Then, pressurized fluid is supplied to the piston-cylinder 30 to lift up the lower rim 21 through the piston rod 31 and elevator shaft 24, the lower rim 21 simultaneously lifting up the tire (a) from the conveyer 1. By this upward movement of the elevator shaft 24 the conical nose portion 25 is fitted into the conical bore 10 to bring the drive shaft 6 and elevator shaft 24 axially in alignment with each other, and the tire (a) is gripped airtightly between the upper and lower rims 4 and 21. In the next phase of operation, compressed air is fed into the tire (a) through the air passage 9 and air ports 26. In this state, the upper and lower rims 4 and 21 and tire (a) are integrally rotated by the drive shaft 6, while the load wheel 33 is pressed at one side of the rotating tire (a) to check for variations in reaction force of the tire (a) around its entire circumference by the load cells 34, judging the uniformity of the tire (a) according to the results of the inspection.

Provided in the upper portion of the drive shaft 6 are a position detector 42 and a pulse sensor 43 which are associated with the drive shaft 6 through a rotary arm 40 and gears 41, respectively. The position detector 42 detects the reference point of rotational angle of the upper rim 4, while the pulse sensor 43 detects the rotational angle at the rate of 360° per revolution when the upper and lower rims 4 and 21 are rotated in synchronism with each other by engagement of the seat member 7 and elevator shaft 24. On the other hand, a position detector 44 which detects the reference point of rotational angle of the lower rim 21 is mounted on the bearing case 29. This position detector 44 is operated by a rotary arm 45 which is downwardly projected from a marginal edge portion of the lower rim 21.

Each time a tire (a) is mounted and dismantled before and after an inspection, the seat member 7 and elevator shaft 24 are coupled and uncoupled. As the seat member 7 of the upper assembly is continuedly put in rotation, there occurs a change in the relative angle (phase) in the rotational direction of the upper and lower rims 4 and 21 each time a new tire is mounted. Therefore, it becomes necessary to check the phase angles by providing position detectors 42 and 44 for the respective rims 4 and 21. With this arrangement, the reference points of the rotational angles of the upper and lower rims 4 and 21 are detected by the upper and lower position detectors 42 and 44, respectively, while sensing pulse signals at each rotational angle of 1° of the upper and lower rims 4 and 21 by the pulse sensor 43, thereby to correct errors which occur to the values of measurement in the tire uniformity inspection due to radial runout of the upper and lower rims 4 and 21, by the method as will be described hereinafter.

In order to check the radial runout, the upper and lower rims 4 and 21 which are indirectly coupled by engagement of the seat member 7 and elevator shaft 24 are rotated, without mounting a tire (a). Then, deflection detectors 46 and 47 are contacted radially from outside respectively with the upper and lower rims 4 and 21 which are in rotation to measure the amount of radial runout of each rim around the entire circumference thereof. Simultaneously, the rotational angles and reference points of the respective rims 4 and 21 are detected by the position detectors 42 and 44, respectively, sensing up the angle pulses of the indirectly coupled rims 4 and 21 by the pulse sensor 43. The positional relations in this operation are diagrammatically illustrated in FIGS. 4 and 5, and waveforms of resulting signals are shown in FIG. 6.

Figure 4:
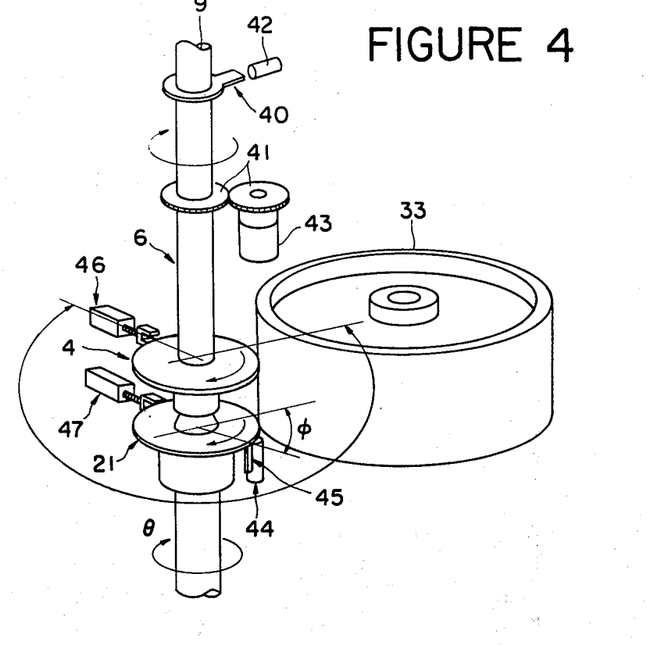
FIG. 4 is a diagrammatic perspective view showing relative positions of rotating component parts by various detectors.
Figure 5:
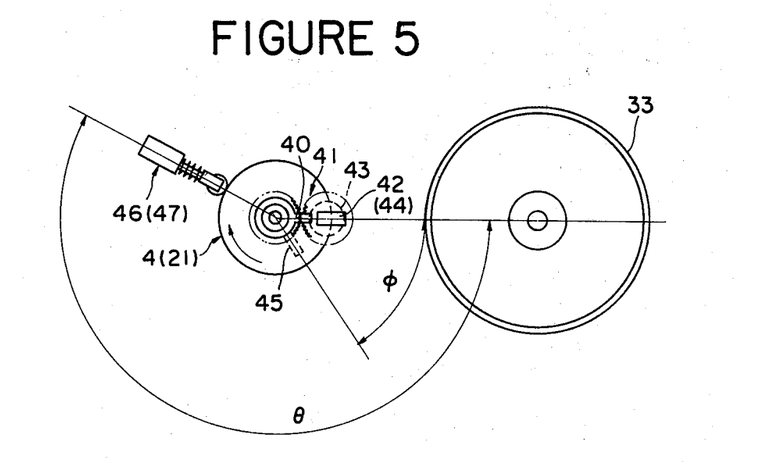
FIG. 5 is a diagrammatic plan view of the rotating component parts and detectors shown in FIG. 4.
Figure 6:
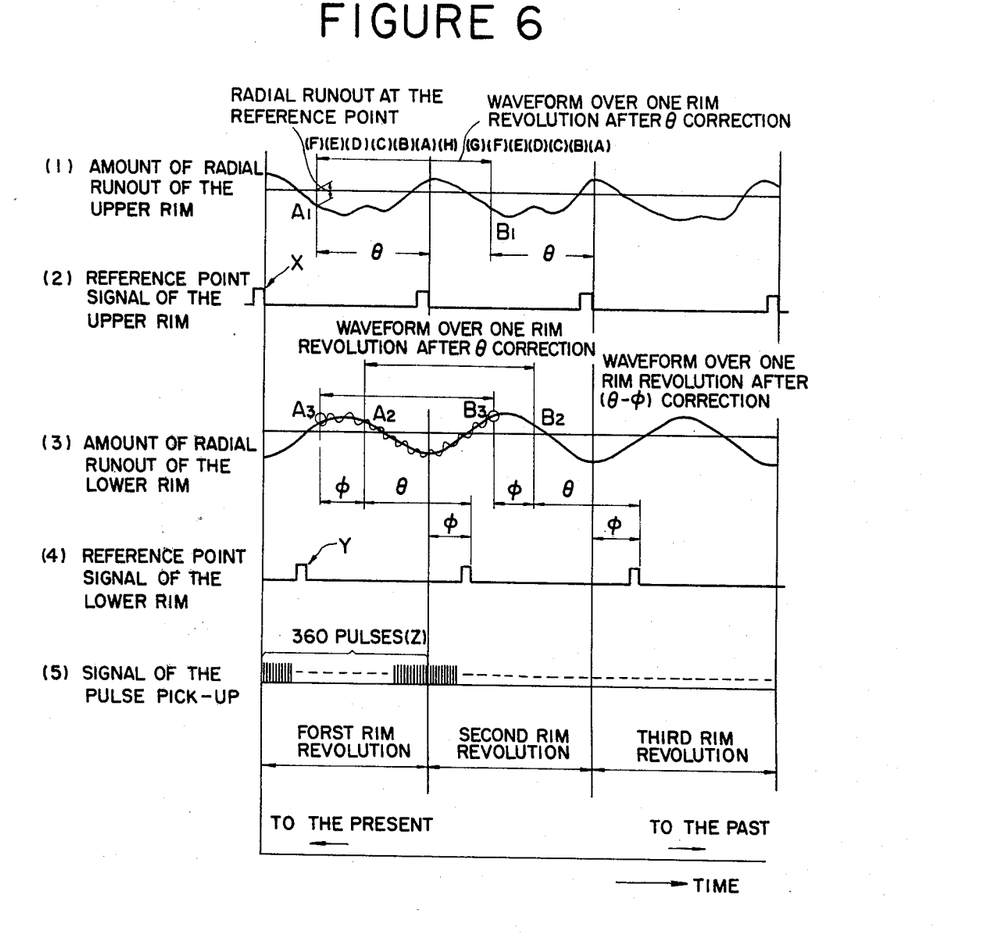
FIG. 6 is a diagram showing waveforms of signals appearing at various points of a correcting circuit.

As shown in FIGS. 4 and 5, if the position detectors 42 and 44 are located on a line passing through the centers of the tire (rim) and the load wheel, while the flutter detectors 46 and 47 are located in positions at an angle $\theta$ with a line passing through the centers of the tire and load wheel, the amounts of radial runout of the rims 3 and 21 which are measured by the deflection detectors 46 and 47 are advanced in phase by the angle $\theta$ than the line passing through the centers of the tire and load wheel. Since the force which is produced by tire (a) under the influence of deflections of the rims 4 and 21 occurs at its contact point with the load wheel 33, the signals indicative of the amounts of radial runout measured by deflection detectors 46 and 47 have to be delayed by the angle $\theta$ in order to bring the measured amounts of radial runout on the line passing through the centers of the tire and load wheel. As shown in FIG. 6, the waveform of the deflection signal which is delayed by the angle $\theta$ from a reference point pulse, that is to say, the waveform in the period from point $A_1$ or $A_2$ to point $B_1$ or $B_2$, which corresponds to one revolution (360°) of the rim, is the waveform of the deflection signal effective for the correction and stored in an electric circuit as will be described hereinafter. On the other hand, the lower rim 21 is uncoupled from the upper rim 4 each time a tire (a) is mounted or dismantled, so that its phase relative to the upper rim 4 changes from one inspecting operation to another. Therefore, it becomes necessary to make corrections by shifting the waveform of the deflection signal of the lower rim according to a change in phase. This can be attained by detecting by the use of the output signal Z the phase angle $\phi$ of the reference points X and Y of rotating upper and lower rims 4 and 21 with a tire (a) actually mounted therebetween, and delaying the effective period A2–B2 further by the angle $\phi$ to a period A3–B3. By these operations, the heads A1 and A3 of the effective signal periods are synchronized when the position detector 42 is actuated by the rotary arm 40 which is mounted on the drive shaft, thus reproducing the stored signals of radial runout of the upper and lower rims 4 and 21. In FIG. 6, shown at (1) is the amount of radial runout of the upper rim, at (2) the reference point signals of the upper rim 4, at (3) the runout of radial amount of the lower rim 21, at (4) the reference point signals of the lower rim 21, and at (5) the signals of the pulse sensor 43.

Figure 7:
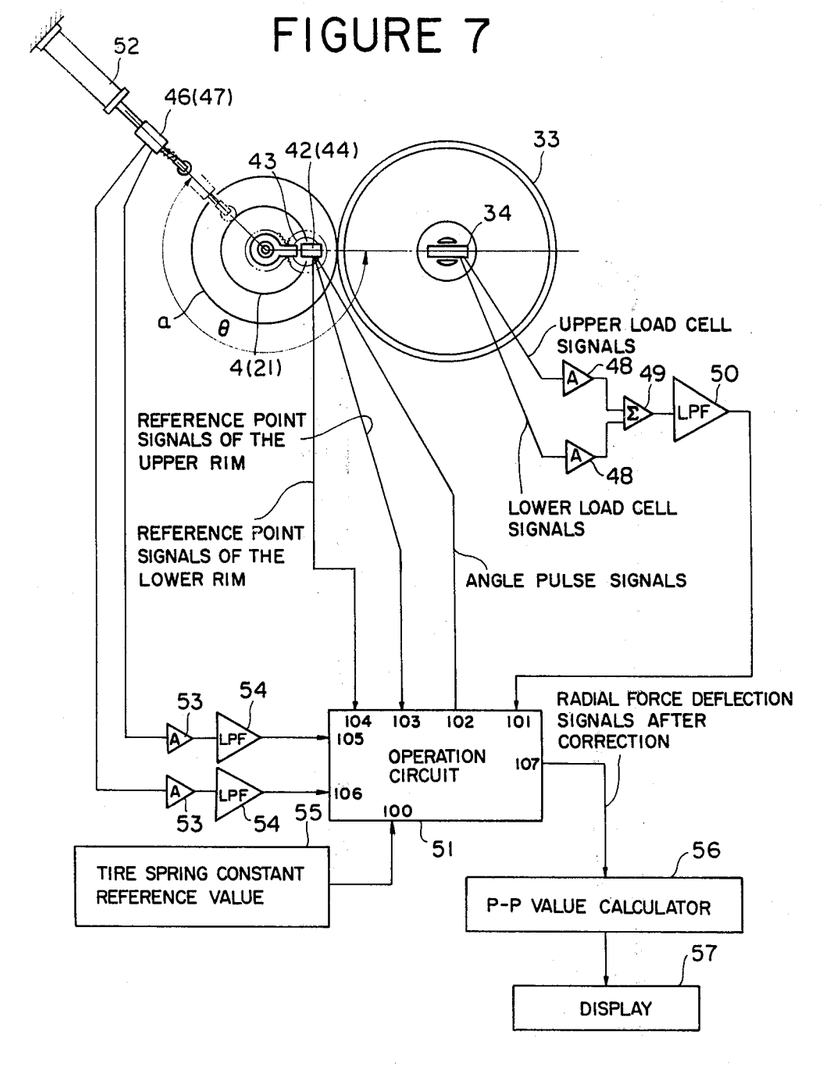
FIG. 7 is a diagrammatic illustration showing flow of various signals.

Now, the method of the present invention is described more particularly with reference to FIG. 7. As seen therein, the signals from a pair of load cells 34 which are mounted on the load wheel 33 are separately amplified by amplifiers 48, added by an adder 49 and, after being passed through a low-pass filter 50 for stabilization, fed to an arithmetic operation circuit 51. The two deflection detectors 46 and 47 which detect radial runout of the upper and lower rims 4 and 21 are located opposingly with respect to the respective rims 4 and 21 and in positions of the angle $\theta$ from a line passing through the centers of the tire and load wheel. The deflection detectors 46 and 47 are radially retractably supported on a piston-cylinder 52 so that they are sufficiently retracted to a position free of a tire (a) which is mounted between the upper and lower rims 4 and 21, and can be advanced into contact with the rims 4 and 21 when a tire is not mounted thereon. The output signals of the deflection detectors 46 and 47 (signals indicating the amounts of radial runout of the respective rims) are separately amplified by amplifiers 53 and passed through low-pass filters 54 for amplification and stabilization of the signals and then fed to the arithmetic operation circuit 51. The pulse signals of the pulse sensor 43 which produces 360 pulses per revolution of the drive shaft 6 as well as the signals from the position detectors 42 and 44 of the upper and lower rims are also fed to the arithmetic operation circuit 51.

Figure 8:
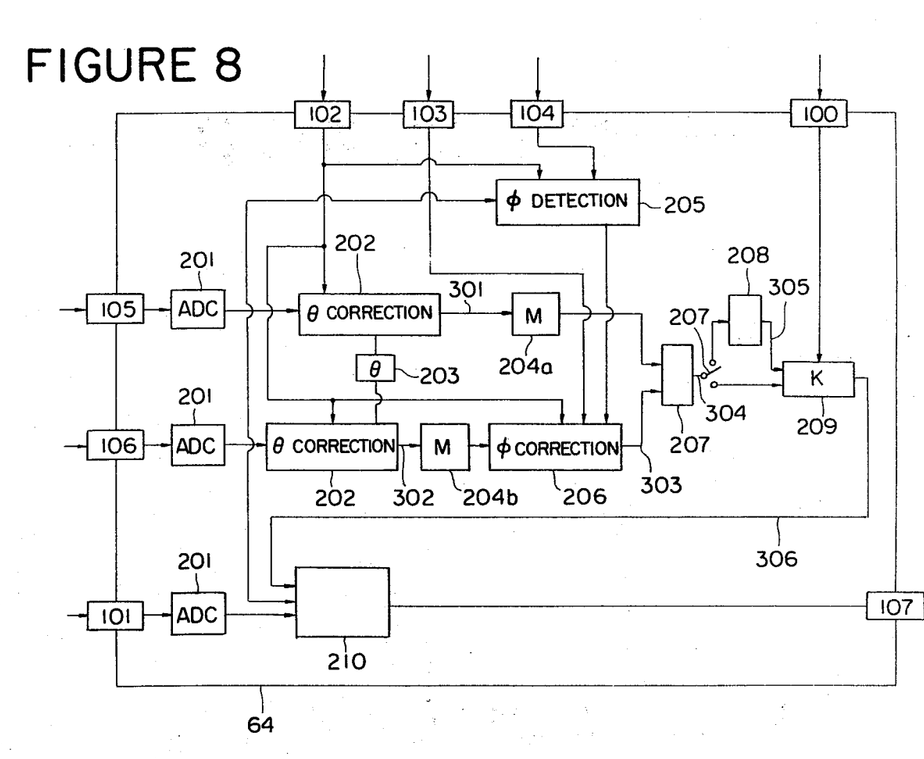
FIG. 8 is a block diagram of an arithmetic operation circuit.

The arithmetic operation unit 51 which is arranged as shown in FIG. 8 performs the operations as will be described hereafter. The signals to input terminals 105, 103, 106, 104 and 102 of the arithmetic operation unit 51 correspond to the signals (1) to (3), respectively. The signals from deflection detectors 46 and 47 indicative of the amounts of radial runout of the upper and lower rims 4 and 21, which are rotated without mounting a tire (a), are passed through the amplifiers 48 and low-pass filter 54 and fed to input terminals 105 and 106 of the arithmetic operation circuit 51. The analog quantities of these signals are digitized by A/D converters 201 and fed to $\theta$-correction circuits 202 which offset the lead angle of lead $\theta$ of the detected signal phase. The $\theta$-correction circuit 202 delays the received signals by $\theta°$, for example, by the use of shift registers, in response to the output signal of a $\theta$-setting unit 203 indicating an arbitrarily selected lead angle $\theta$. The pulse signals of the pulse sensor 43 which produces 360 pulses per revolution of the drive shaft are used as clock pulses for the delay of $\theta°$. On the basis of the pulse signals fed to the arithmetic operation unit 51 and $\theta$-correction circuit 202, the deflection signals in the shift registers are delayed by the arithmetic operation unit 51 at a rate of 1° per pulse to offset the lead angle $\theta$. After the correction of the angle $\theta$, the deflection signals of the upper and lower rims 4 and 21 are temporarily stored in memories 204a and 204b.

Figure 9:
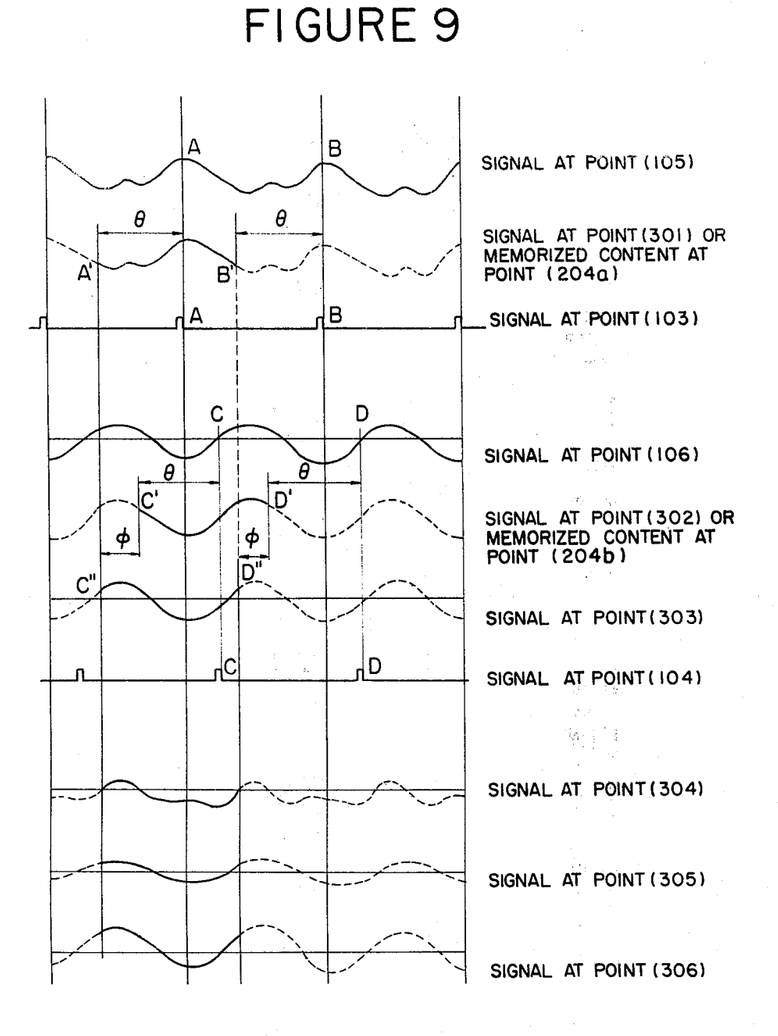
FIG. 9 is a diagram showing waveforms of signals appearing at various points of the arithmetic operation circuit.

Now, in an operation for inspecting uniformity of a tire (a) which is mounted between the upper and lower rims 4 and 21, if the phase angle formed by the reference points of the coupled upper and lower rims is $\phi$, the position detectors 42 and 44 produce output signals as shown at (2) and (4) as the two rims are rotated in the same direction after coupling. The arithmetic operation unit 51 receives the output signals of the position detectors 42 and 44 at its terminals 103 and 104 and the pulse signals of the pulse sensor at its terminal 102, which is connected to $\phi$-detection circuit 205 to determine the phase angle $\phi$. A $\phi$-correction circuit 206 receives the output of the $\phi$-detection circuit 205, and the deflection signals of the lower rim 21 from the memory circuit 204b to make correction of the phase angle $\phi$ thereto. Then, the memory circuits 204a and 204b send out deflection signals of the upper and lower rims 4 and 21 to a sum-averaging circuit 207 where the signals are added and averaged. The sum-averaged deflection signal is sent, if desired, to a harmonic analyzer 208 through a switch 207, extracting a primary harmonic component of the waveform by the harmonic analyzer 208 before sending the signal to a multiplier 209 for multiplication by the spring constant of the tire (a), or the averaged signal is sent directly to the multiplier 209 without being passed through the harmonic analyzer 208 and multiplied by the spring constant of the tire which is specified by a spring constant setting unit 55. The extraction of the primary component of waveform serves to eliminate deflections of relatively small ranges due to small depressions or bruises which might be present on the rims 4 and 21, since such depressions and bruises have a great influence on the correction although not much on the tire (a) itself. FIG. 9 illustrates the foregoing signal processing operations in analog form.

The output signal 306 of the multiplier 209 is fed to a subtractor 210 which subtracts the deflection signal 306 from a variation signal which represents a variation in radial force of the tire (a) and which is fed to the input terminal 101 and A/D converter 201 of the arithmetic operation unit 51 after necessary amplification and stabilization. Thus, there is obtained a signal of variations in the radial force of the tire which is free of errors due to radial runout of the rims 4 and 21. The corrected signal is fed to a P—P (peak to peak) value calculator 56 to determine a varying component of the signal and to indicate it on a display 57. The P—P value calculator 56 and display 57 functions in the same manner as in the conventional tire uniformity inspecting machines and thus description of their functions is omitted.

Figure 10:
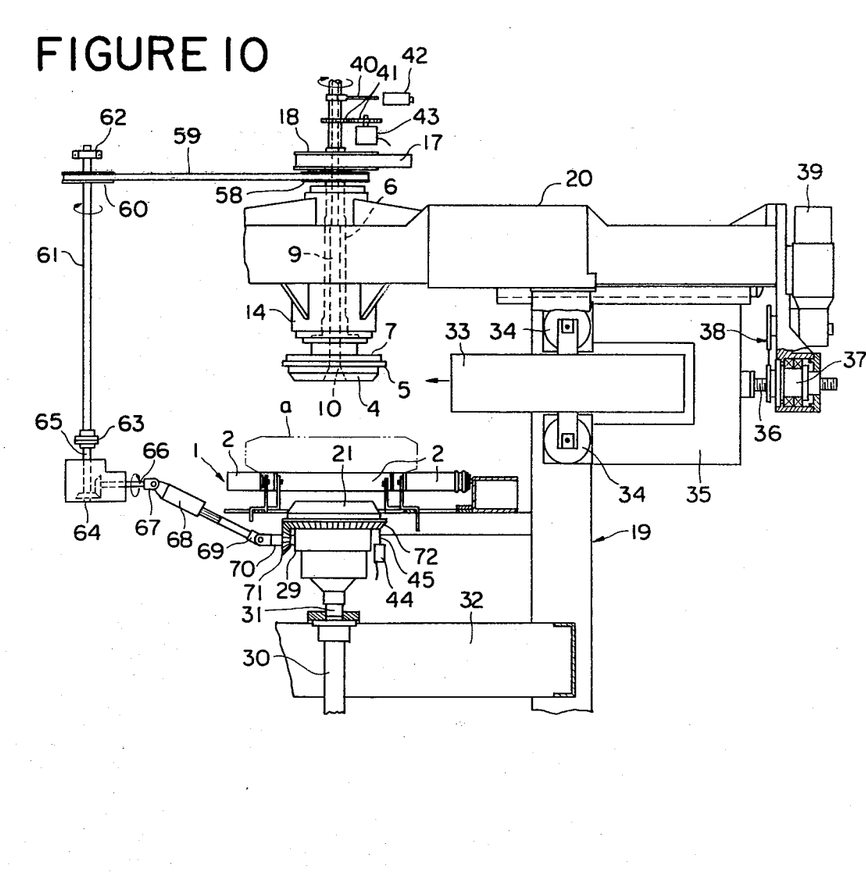
FIG. 10 is a diagrammatic illustration showing another embodiment of the invention.

It is needless to mention that the $\phi$-correction by the arithmetic operation unit 51 can be omitted in a case where the upper and lower rims 4 and 21 are in constant relation in phase. FIG. 10 illustrates an embodiment where the upper and lower rims 4 and 21 are matched in phase.

More specifically, in the embodiment of FIG. 10, a timing pulley 58 is provided on the drive shaft 6 which rotatingly drives the upper rim 4, transmitting the rotation of the timing pulley 58 to a transmission shaft 61 through a timing belt 59 and a timing pulley 60 in order to match the phases of the upper and lower rims 4 and 21 at the time of coupling. The transmission shaft 61 which is disposed parallel with the drive shaft 6 has its upper end supported by a bearing 62 and its lower end linked to an input shaft 65 of a bevel gear box 64 through a coupling 63. The output shaft 66 of the bevel gear box 64 is linked to a transmission shaft 70 of a bearing case 29 through a universal joint 67, spline coupling 68 and a universal joint 69. In turn, the transmission shaft 70 is linked to the lower rim 21 through bevel gears 71 and 72. Thus, if the reduction ratio of the bevel gear box 64 is 1:1 and if the reduction ratio of the upper timing pulleys 58 and 60 is a reciprocal number of the reduction ratio of the lower bevel gears 71 and 72, the upper and lower rims 4 and 21 are rotated constantly in the same direction and at the same speed, thus maintaining the same phase angle.

Figure 11:
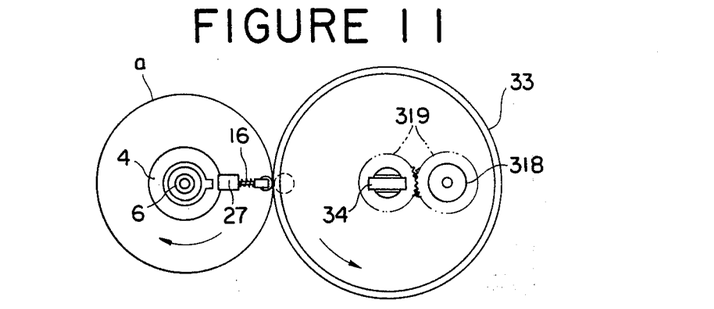
FIG. 11 is a diagrammatic illustration of a load wheel in contact with a tire in still another embodiment applying the principles of the invention to the correction of errors due to radial deflections of the load wheel.
Figure 12:
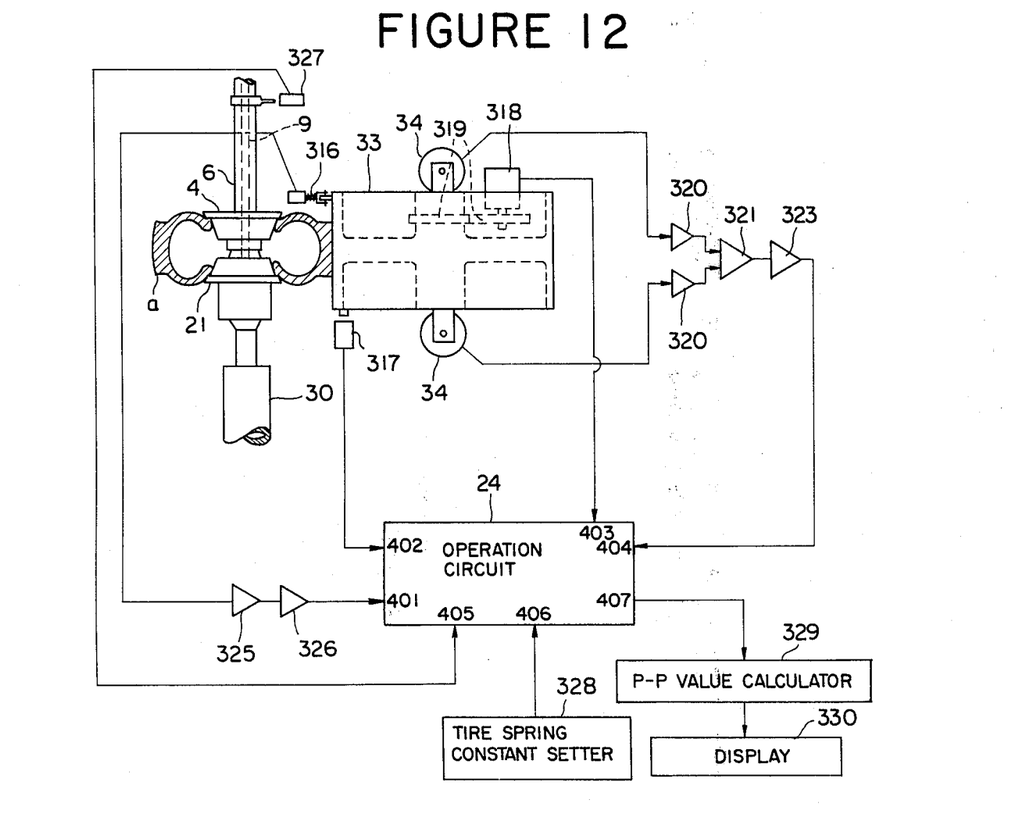
FIG. 12 is a diagrammatic illustration showing flow of various signals.

FIGS. 11 and 12 illustrate a further embodiment of the present invention, in which the principles of the invention are applied to correct errors due to radial runout of the load wheel and which includes a deflection detector 316 located on a line passing through the centers of the tire (a) and load wheel 33 for detecting radial runout of the load wheel 33, a position detector 117 for detecting rotational angle of the load wheel 33 by way of a reference point provided on the load wheel 33, and a pulse sensor 318 associated with the load wheel 33 through a gear system 319 and rotatable with the load wheel 33 at a speed ratio of 1:1 to produce a predetermined number of pulses per revolution of the load wheel 33 in the same manner as in the preceding embodiments.

In order to check the radial runout of the load wheel 33 prior to an inspecting operation, the position detector 316 is moved forward by suitable means (not shown) for contact with the load wheel 33 when no tire is mounted on the upper and lower rims 4 and 21, and the load wheel 33 is rotated manually or by a suitable rotating mechanism (not shown), detecting radial deflections of the load wheel 33 with respect to the entire circumference thereof. Alternatively, arrangements may be made to detect radial deflections of a load wheel which is rotated in contact with an inspecting tire (a) by a position detector 316 which is located in a position free of the tire (a) as shown in FIGS. 11 and 12. The output signals of a pair of load cells 34 which are mounted in the upper end portion of the load wheel shaft are separately amplified by amplifiers 320 and added by an adder 321, which is, after being passed through a low-pass filter 323 for stabilization, fed to an arithmetic operation circuit 324. On the other hand, the output signal of the deflection detector 316 which detects radial runout of the load wheel 33 is amplified by an amplifier 325 and, after being passed through a low-pass filter 326 for stabilization, fed to the arithmetic operation circuit 324. Besides the just-mentioned two signals, the arithmetic operation circuit 324 receives the output signal of an arbitrary detector 317 which detects the reference point of rotation of the load wheel 33, the output signal of the pulse sensor 318, and the output signal of the position detector 327 which detects the reference point of rotation of the tire (a).

Figure 13:
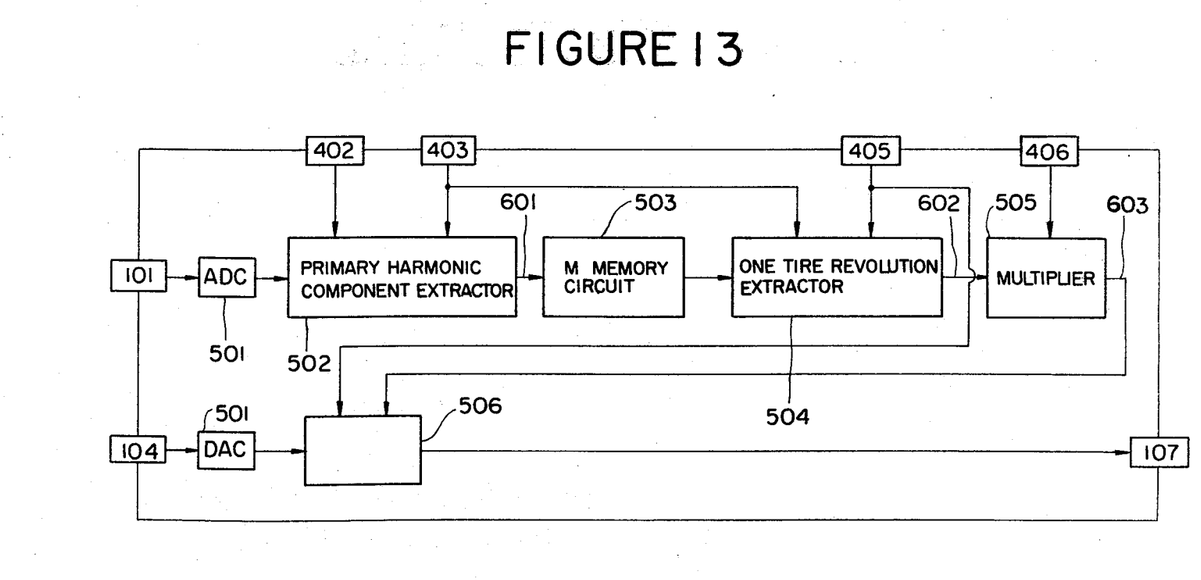
FIG. 13 is a block diagram of an arithmetic operation circuit.
Figure 14:
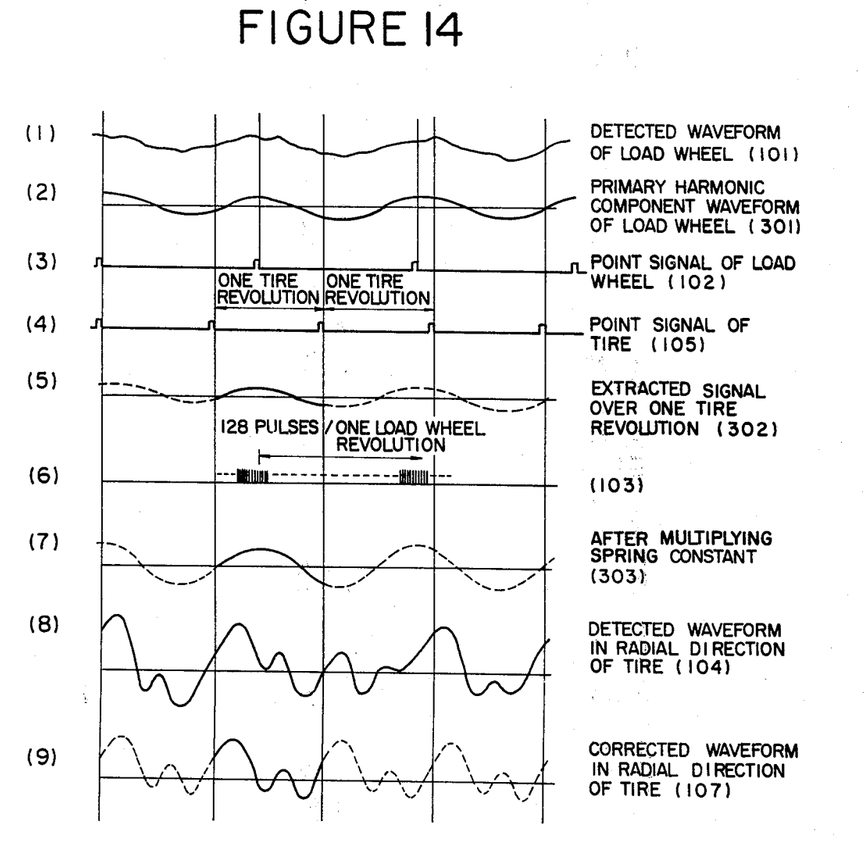
FIG. 14 is diagram showing waveforms of signals appearing at various points of a correcting circuit.

The arithmetic operation circuit 324 which is arranged as shown in FIG. 13 processes the received signals in the following manner. The load wheel deflection signal supplied to the terminal 401 is digitized by an A/D converter 501 and fed to a primary harmonic component extractor 502. The waveform of this signal is shown in analog form at (2) of FIG. 14. The extractor 502 has a function of calculating the primary harmonic component of the load wheel deflection signal waveform for one period of revolution of the load wheel. The signal 601 of the thus calculated primary harmonic component for one period of revolution of the load wheel is stored in a memory circuit 203. The waveform of the signal at this stage is shown in analog form at (2) of FIG. 14 with respect to one revolution of the load wheel 33. Thus, all the amount of radial runout of the load wheel 33 in one period of rotation is stored in the memory circuit 503. On the other hand, the signal of reference point is fed to an extractor 504 through terminal 405 per revolution of the drive shaft 6 which rotates the tire (a). The extractor 504 is at the same time supplied with the output signal of the pulse pick-up which detects the rotational angle of the load wheel 33 and with the load wheel deflection signal from the memory circuit 503. The extractor 504 functions to extract the signal of deflection of the load wheel 33 which is in contact with the tire (a) with respect to a period corresponding to one revolution of the tire (a). The extracted signal is shown in analog form at (5) of FIG. 14. The deflection signal for one tire revolution is fed to a multiplier 505 where it is multiplied by a signal of spring constant which is received at terminal 406 and specified by a tire spring constant setter 328, to obtain a force variation signal 606. The waveform of the signal at this stage is shown in analog form at (7) of FIG. 14. The variation in the force which occurs between the tire (a) and load wheel 33 is fed to terminal 404 without removing the influence of runout of the load wheel 33 and, after digitization at the converter 501, fed to a subtractor 506. It is at the subtractor 506 that the erroneous component due to load wheel runout is removed from the tire variation signal by subtracting therefrom the erroneous variation signal which is simultaneously fed from the multiplier 505. The signal of radial force variations of the tire (a), if expressed in analog form, has a waveform as shown at 8 of FIG. 14, while the signal of the subtracting erroneous variations has, as shown at 9 of the same figure, a reproducible waveform. The corrected signal which appears at terminal 407 represents the variations in the radial force of the tire (a), and it is fed to a P—P (peak to peak) calculator 329. The P—P value calculated by the P—P calculator 329 is indicated on a display 320 as a variable component of the radial force in the known manner as mentioned hereinbefore.

As clear from the foregoing description of preferred embodiments, the accuracy of measurement in the tire uniformity inspecting machine can be enhanced to a significant degree by correcting the errors of measurement due to radial runout of the upper and lower rims and/or of the load wheel according to the method of the present invention. It follows that the fabrication or maintenance and service of the inspecting machine can be facilitated since it becomes possible to employ broader tolerances in the machining process. Besides, the influences owing to small bruises or other defects on the part of the rims can be eliminated by extraction of the primary harmonic component by the harmonic analysis.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for correcting errors of measurement in a tire uniformity inspecting machine having a pair of upper and lower rims engageable with bead portions of a tire for gripping said tire securely for rotation at a predetermined position and a load wheel engageable with the circumference of said tire at one side thereof to check for variations in the radial force of said tire, said method comprising:
measuring radial runout of said rims and load wheel to obtain an erroneous deflection signal indicating the amount of radial runout of said rims and load wheel;
obtaining and storing a primary harmonic component of said erroneous deflection signal;
measuring variations in radial force of a tire rotated on said rims to obtain a radial variation signal for a period of one revolution of said tire;
multiplying said erroneous deflection signal by a spring constant of said tire to obtain an erroneous variation signal; and
subtracting said erroneous variation signal from said radial variation signal to eliminate influence of radial runout of said rims and load wheel from the measured value of said radial force of said tire.

2. A method for correcting errors of measurement in a tire uniformity inspecting machine having a pair of upper and lower rims engageable with bead portions of a tire for gripping said tire securely for rotation at a predetermined position and a load wheel engageable with said tire on the circumference thereof to check for variations in the radial force of said tire, said method comprising:
measuring radial runout of said upper and lower rims to obtain erroneous deflection signals for a period of one revolution thereof;
storing the resulting erroneous deflection signals in memories;
measuring variations in radial force of a tire rotated on said rims to obtain radial variation signal for a period of one revolution thereof;
processing said erroneous deflection signals to synchronize phases of rotation of said upper and lower rims with each other and with said tire;
adding and averaging said erroneous deflection signals;
obtaining a primary harmonic component of the resulting averaged signal by harmonic analysis; and
multiplying the primary harmonic component of the averaged erroneous deflection signal by the spring constant of said tire to obtain a signal of an erroneous component to be subtracted from the measured value of radial force of said tire.

3. A method as set forth in claim 1, wherein said erroneous deflection signals and radial variation signal are process in digitized forms in an arithmetic operation circuit.

4. A method as set forth in claim 1, wherein phases of said erroneous deflection signals are synchronized by reference to pulse signals indicating reference points of rotation of said upper and lower rims and a pulse signal indicating rotational speed of said upper and lower rims.

5. A method for correcting errors of measurement in a tire uniformity inspecting machine having a pair of upper and lower rims engageable with bead portions of a tire for gripping said tire securely for rotation at a predetermined position and a load wheel engageable with the circumference of said tire at one side thereof to check for variations in the radial force of said tire, said method comprising:
measuring radial runout of said load wheel to obtain an erroneous deflection signal;
obtaining and storing a primary harmonic component of said erroneous deflection signal;
measuring variations in radial force of a tire rotated on said rims to obtain a radial variation signal for a period of one revolution of said tire;
extracting said primary harmonic component of said erroneous deflection signal corresponding to said period of rotation of said tire; and
multiplying the extracted signal by a spring constant of said tire to obtain a signal of erroneous variations to be substracted from the measured value of said radial force of said tire.

6. A method as set forth in claim 4, wherein said erroneous deflection signal and radial variation signal are processed in digitized forms.

7. A method as set forth in claim 4, wherein the phase analog of said erroneous deflection signal relative to said radial variation signal is detected by way of a pulse signal indicating a reference point of said tire and a pulse signal indicating rotational angle of said load wheel.

* * * * *

UNITED STATES PATENT AND TRADEMARK OFFICE
CERTIFICATE OF CORRECTION

PATENT NO. : 4,404,848
DATED : February 23, 1983
INVENTOR(S) : ATSUAKI IWAMA ET AL.

It is certified that error appears in the above-identified patent and that said Letters Patent is hereby corrected as shown below:

In the Abstract, line 9, delete "erronous" and insert --erroneous--.

In column 5, line 57, the words "runout" and "amount" should be reversed.

In column 10, line 30, delete "process" and insert --processed--.

In column 10, line 57, delete "substracted" and insert --subtracted--.

Signed and Sealed this

Thirty-first Day of January 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,404,848
DATED      : September 20, 1983
INVENTOR(S): Atsuaki Iwama et al It is certified that error appears in the above-identified patent and that said Letters Patent is hereby corrected as shown below:

On the title page:
--[30]  Foreign Application Priority Data

Feb. 26, 1981 [JP]  Japan  ........56-29015

Mar. 3, 1981 [JP]  Japan  ........5630650 --

Signed and Sealed this

Seventeenth Day of April 1984

[SEAL]

Attest:

GERALD J. MOSSINGHOFF

Attesting Officer    Commissioner of Patents and Trademarks